(12) United States Patent
Kim

(10) Patent No.: US 11,687,032 B2
(45) Date of Patent: Jun. 27, 2023

(54) HOLOGRAM DISPLAY DEVICE

(71) Applicant: SAMSUNG DISPLAY CO., LTD., Yongin-si (KR)

(72) Inventor: Sang-Ho Kim, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 349 days.

(21) Appl. No.: 16/931,213

(22) Filed: Jul. 16, 2020

(65) Prior Publication Data
US 2021/0055690 A1 Feb. 25, 2021

(30) Foreign Application Priority Data

Aug. 19, 2019 (KR) .................... 10-2019-0101293

(51) Int. Cl.
*G03H 1/22* (2006.01)

(52) U.S. Cl.
CPC ....... *G03H 1/2294* (2013.01); *G03H 2222/12* (2013.01); *G03H 2223/15* (2013.01); *G03H 2223/23* (2013.01)

(58) Field of Classification Search
CPC ......... G02F 1/133514; G02F 1/133512; G02F 2201/123; G02F 1/133603; G02F 1/133621; G03H 1/2294; G03H 2001/0224; G03H 2210/30; G03H 2225/60; G03H 2001/2271; G03H 2222/12; G03H 2223/15; G03H 2223/23; G03H 2222/17; G03H 2225/35; G09G 3/3607; G09G 2320/0271

USPC ..................................... 359/11, 22
See application file for complete search history.

(56) References Cited

U.S. PATENT DOCUMENTS

| | | | |
|---|---|---|---|
| 7,492,515 B2 | 2/2009 | Hamagishi et al. | |
| 9,400,486 B2 | 7/2016 | Lee et al. | |
| 2005/0286096 A1 | 12/2005 | Yoon | |
| 2015/0339968 A1* | 11/2015 | Yoshioka | G02F 1/1368 345/89 |
| 2019/0011881 A1* | 1/2019 | Tan | G02B 27/4272 |

FOREIGN PATENT DOCUMENTS

| | | |
|---|---|---|
| KR | 10-2005-0122321 | 6/2006 |
| KR | 10-2014-0112271 | 9/2014 |

* cited by examiner

*Primary Examiner* — Jade R Chwasz
(74) *Attorney, Agent, or Firm* — F. Chau & Associates, LLC

(57) ABSTRACT

A hologram display device includes a light source unit that generates light, a spatial light modulation panel that spatially modulates light received from the light source unit and generates diffracted light, and an optical unit that generates a holographic image using the diffracted light. The spatial light modulation panel includes first color filters, second color filters, and third color filters. The number of the second color filters is greater than the number of each of the first and third color filters. During a turned-on state of the spatial light modulation panel, a shortened distance in a predetermined direction between second color images displayed through the second color filters is substantially equal to a distance in the predetermined direction between first color images displayed through the first color filters and a distance in the predetermined direction between third color images displayed through the third color filters.

20 Claims, 14 Drawing Sheets

HOLOGRAM DISPLAY DEVICE

CROSS-REFERENCE TO RELATED APPLICATION

This U.S. non-provisional patent application claims priority under 35 U.S.C. § 119 from, and the benefit of, Korean Patent Application No. 10-2019-0101293, filed on Aug. 19, 2019 in the Korean Intellectual Property Office, the contents of which are herein incorporated by reference in their entirety.

BACKGROUND

1. Technical Field

Embodiments of the present disclosure are directed to a hologram display device. More particularly, embodiments of the present disclosure are directed to a hologram display device that utilizes a spatial light modulation method.

2. Discussion of the Related Art

A three-dimensional (3D) image technology using a hologram method is being spotlighted as a next generation 3D image technology that should ultimately be reached since a hologram-based 3D image technology can fundamentally avoid the visual fatigue of a stereoscopic method that depends on binocular disparity to perceive a 3D image. In the case of a holographic image, since a user sees an actual 3D image formation with their own eyes unlike conventional methods that use an illusion to get a 3D effect, the user experiences a 3D effect that is substantially the same as seeing the real thing. Accordingly, a hologram method does not cause substantial visual fatigue even though a user may view the 3D images for a long time.

Recently, a hologram technology using a digital hologram method is attracting much attention. A digital hologram method uses a spatial light modulator, and the performance of the spatial light modulator is an important factor in determining the performance of the hologram.

A liquid crystal display panel is used as the spatial light modulator, and a pixel size and a distance between pixels of the liquid crystal display panel determine a size and viewing angle of a holographic ima2ge in a hologram display.

SUMMARY

Embodiments of the present disclosure provide a hologram display device that can prevent distortion of a holographic image due to chromatic aberration.

Embodiments of the inventive concept provide a hologram display device that includes a light source unit that generates light, a spatial light modulation panel that spatially modulates the light received from the light source unit and generates diffracted light, and an optical unit that generates a holographic image using the diffracted light. The spatial light modulation panel includes a plurality of first color filters, a plurality of second color filters, and a plurality of third color filters. The number of the second color filters is greater than the number of each of the first and third color filters. During a turned-on state of the spatial light modulation panel, a distance in a plan view between second color images displayed through a first group of the second color filters is substantially equal to a distance in a plan view between first color images displayed through the first color filters and a distance in a plan view between third color images displayed through the third color filters. Black gray scale images are displayed through a second group of the second color filters during a turned-on state of the spatial light modulation panel.

The spatial light modulation panel includes a plurality of pixels, and each of the pixels includes first, second, third, and fourth sub-pixels.

The first, second, third, and fourth sub-pixels correspond to one first color filter, one third color filter, and two second color filters.

During the turned-on state of the spatial light modulation panel, one sub-pixel of two sub-pixels that correspond to the two second color filters displays the second color images and the other sub-pixel of the two sub-pixels that correspond to the two second color filters displays the black grayscale images.

The hologram display device further includes a controller that controls the spatial light modulation panel. The controller receives first, second, third, and fourth sub-pixel data that respectively correspond to the first, second, third, and fourth sub-pixels and includes a black grayscale converter that converts sub-pixel data that corresponds to one of two sub-pixels of the first, second, third, and fourth sub-pixels to black grayscale data.

The first sub-pixel corresponds to the one first color filter, the second sub-pixel is adjacent to the first sub-pixel in a first direction and corresponds to one second color filter of the two second color filters, the third sub-pixel is adjacent to the first sub-pixel in a second direction and corresponds to the one third color filter, and the fourth sub-pixel is adjacent to the second sub-pixel in the second direction and adjacent to the third sub-pixel in the first direction and corresponds to the other second color filter of the two second color filters.

During the turned-on state of the spatial light modulation panel, one sub-pixel of the second and fourth sub-pixels displays the second color images and the other sub-pixel of the second and fourth sub-pixels displays the black grayscale images.

The second sub-pixel has a different area from the fourth sub-pixel.

The area of the second sub-pixel is greater than the area of the fourth sub-pixel, and during the turned-on state of the spatial light modulation panel, the second sub-pixel displays the second color images and the fourth sub-pixel displays the black grayscale images.

During the turned-on state of the spatial light modulation panel, the second and fourth sub-pixels alternately display the black grayscale images at least every one frame.

The second and fourth sub-pixels display the second color image during the turned-on state of the spatial light modulation panel.

The spatial light modulation panel includes a plurality of pixels, a first pixel of the plurality of pixels includes first, second, third, and fourth sub-pixels, and a second pixel of the plurality of pixels, which is adjacent to the first pixel in a first direction, includes fifth, sixth, seventh, and eighth sub-pixels.

The first, second, third, and fourth sub-pixels correspond to one first color filter, one third color filter, and two second color filters, and the fifth, sixth, seventh, and eighth sub-pixels correspond to one first color filter, one third color filter, and two second color filters. The first sub-pixel corresponds to the one first color filter, the second sub-pixel is adjacent to the first sub-pixel in a first direction and corresponds to one second color filter of the two second color filters, the third sub-pixel is adjacent to the first sub-pixel in a second direction and corresponds to the one third color filter, and the fourth sub-pixel is adjacent to the second sub-pixel in the second direction and adjacent to the third sub-pixel in the first direction and corresponds to the other second color filter of the two second color filters.

The fifth sub-pixel corresponds to the one third color filter, the sixth sub-pixel is adjacent to the fifth sub-pixel in the first direction and corresponds to one second color filter of the two second color filters, the seventh sub-pixel is adjacent to the fifth sub-pixel in the second direction and corresponds to the one first color filter, and the eighth sub-pixel is adjacent to the sixth sub-pixel in the second direction and adjacent to the seventh sub-pixel in the first direction and corresponds to the other second color filter of the two second color filters.

During the turned-on state of the spatial light modulation panel, when the second and eighth sub-pixels display the second color images, the fourth and sixth sub-pixels display a black grayscale images.

During the turned-on state of the spatial light modulation panel, when the second and eighth sub-pixels display the black grayscale images, the fourth and sixth sub-pixels display the second color images.

During the turned-on state of the spatial light modulation panel, the second and eighth sub-pixels alternately display the black grayscale images with the fourth and sixth sub-pixels at least every one frame.

During the turned-on state of the spatial light modulation panel, a distance in a first direction between the second color images is substantially equal to a distance in the first direction between the first color images and a distance in the first direction between the third color images.

During the turned-on state of the spatial light modulation panel, a distance in a second direction between the second color images is substantially equal to a distance in the second direction between the first color images and a distance in the second direction between the third color images.

The first color filters are red filters, the second color filters are green filters, and the third color filters are blue filters.

The spatial light modulation panel is a liquid crystal display panel.

Embodiments of the inventive concept provide a hologram display device that includes a light source unit that generates light, a spatial light modulation panel that spatially modulates the light received from the light source unit and generates diffracted light, and an optical unit that generates a holographic image using the diffracted light. The spatial light modulation panel includes a plurality of pixels, and each of the pixels includes first, second, third, and fourth sub-pixels, a plurality of first color filters, a plurality of second color filters, and a plurality of third color filters. A number of the second color filters is greater than a number of each of the first and third color filters, and during a turned-on state of the spatial light modulation panel, a distance in a plan view between second color images displayed through a first group of the second color filters is substantially equal to a distance in a plan view between first color images displayed through the first color filters and a distance in a plan view between third color images displayed through the third color filters. The first, second, third, and fourth sub-pixels correspond to one first color filter, one third color filter, and two second color filters.

Black gray scale images are displayed through a second group of the second color filters during a turned-on state of the spatial light modulation panel.

According to an embodiment of a hologram display device, as the horizontal and vertical distances of the first to third color images are substantially equal to each other, chromatic aberration can be prevented from occurring between the first to third color images.

That is, first to third color holographic images that respectively correspond to the first to third color images are located in the pupil of the observer's eyes, and thus, distortion of the holographic images due to chromatic aberration can be prevented or decreased.

DETAILED DESCRIPTION

Figure 1:
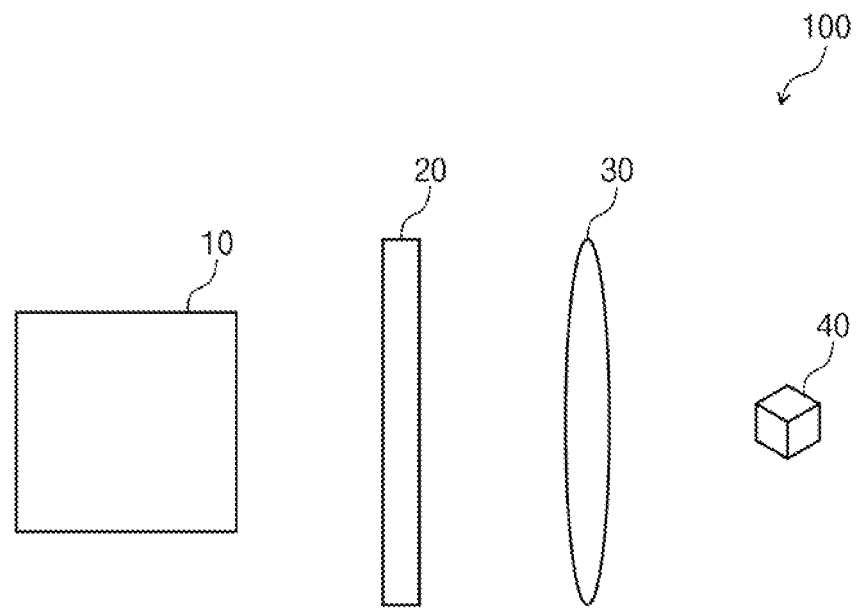
FIG. 1 is a schematic diagram of a hologram display device according to an exemplary embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout. In the drawings, the thickness, ratio, and dimension of components may be exaggerated for effective description of the technical content.

Hereinafter, exemplary embodiments of the present disclosure will be described in detail with reference to the accompanying drawings.

Figure 2:
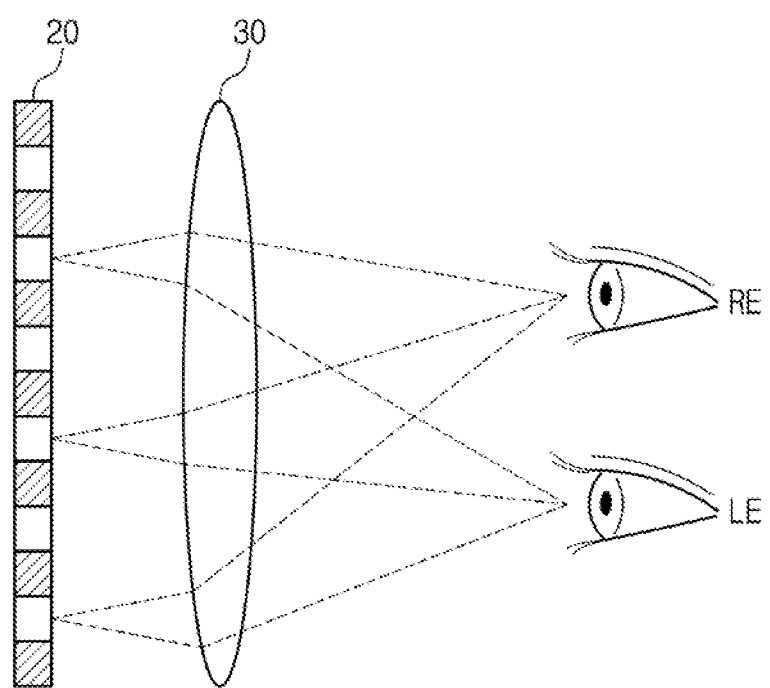
FIG. 2 illustrates an operating principle of a hologram display device shown in FIG. 1.

FIG. 1 is a schematic diagram of a hologram display device 100 according to an exemplary embodiment of the present disclosure, and FIG. 2 illustrates an operating principle of the hologram display device 100 shown in FIG. 1.

Referring to FIG. 1, according to an embodiment, the hologram display device 100 includes a light source unit 10 that generates a light, a spatial light modulation panel 20 that spatially modulates the light received from the light source unit 10, and an optical unit 30 that generates a holographic image 40.

According to an embodiment, the light source unit 10 includes at least one light source. The light source unit 10 emits a coherent surface light. The light source may be a laser or a light emitting diode, which emits coherent light. The light source unit 10 includes red, green, and blue lasers or red, green, and blue light emitting diodes as its light source. In another embodiment, the light source unit 10 includes a white light source that emits white light. The light source unit 10 further includes additional elements so that light is emitted from the light source as a surface light substantially vertical to a front surface of the spatial light modulation panel 20.

According to an embodiment, the spatial light modulation panel 20 receives the light from the light source unit 10 and spatially modulates the light using an electro-optic effect. The spatial light modulation panel 20 spatially modulates the surface light incident thereto using a complex-amplitude hologram. The spatial light modulation panel 20 is a transmissive type liquid crystal display panel that includes a plurality of pixels arranged in a two-dimensional array.

According to an embodiment, the spatial light modulation panel 20 includes a plurality of pixels that display a hologram. The spatial light modulation panel 20 will be described in detail below with reference to FIGS. 4 to 15.

According to an embodiment, the optical unit 30 includes a lens to generate the holographic image 40 at a suitable distance. FIGS. 1 and 2 show a structure in which the optical unit 30 includes one field lens, however, embodiments of the present disclosure are not limited thereto. That is, in other embodiments, the optical unit 30 can include a plurality of lenses.

According to an embodiment, the optical unit 30 converges diffracted light modulated by the spatial light modulation panel 20 onto a focal plane of the lens. Accordingly, a viewing window to observe the holographic image 40 is formed by the optical unit 30 at a position of an observer. The distance between the pixels in the spatial light modulation panel 20 is a variable that can be used to determine a diffraction angle of the diffracted light. When distances in a predetermined direction between color sub-pixels differ from each other when a color hologram is generated, a holographic image of a specific color is located outside the pupil of the observer's eyes RE and LE, and as a result, the holographic image can be distorted due to chromatic aberration.

Hereinafter, a method of allowing the distances in the predetermined direction between the color sub-pixels to be the same as each other to prevent distortion of a holographic image due to chromatic aberration will be described.

Figure 3:
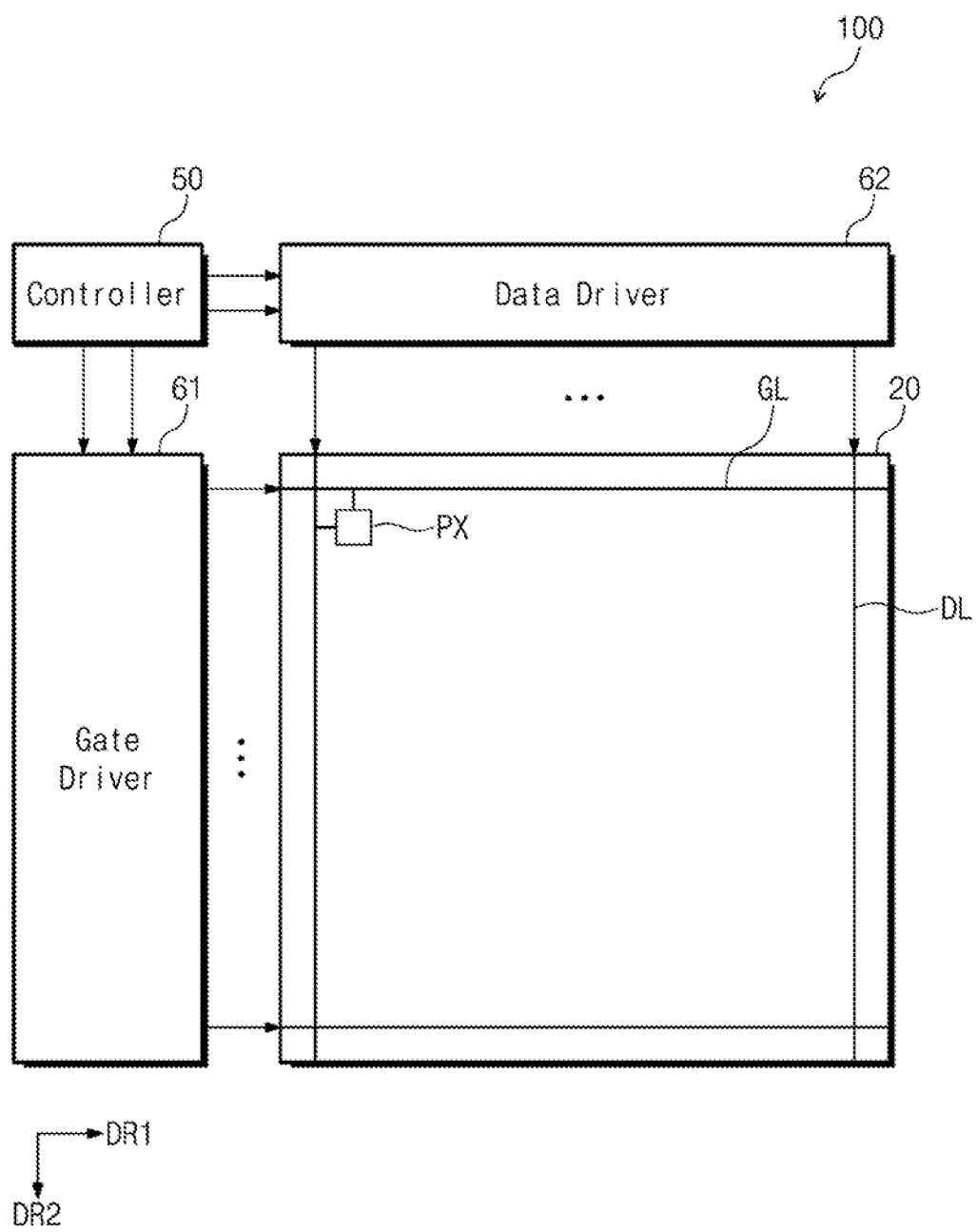
FIG. 3 is a block diagram of a spatial light modulation panel shown in FIG. 1.
Figure 4:
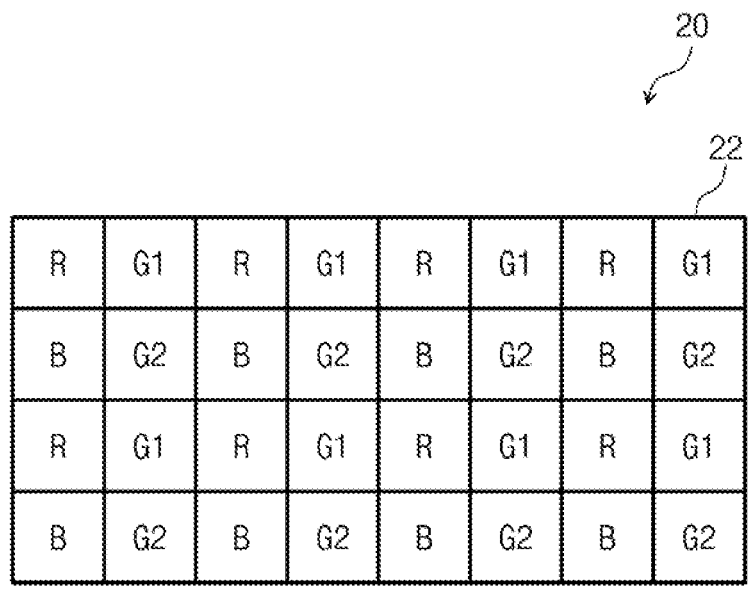
FIG. 4 shows a configuration of a spatial light modulation panel according to an exemplary embodiment of the present disclosure.
Figure 4:
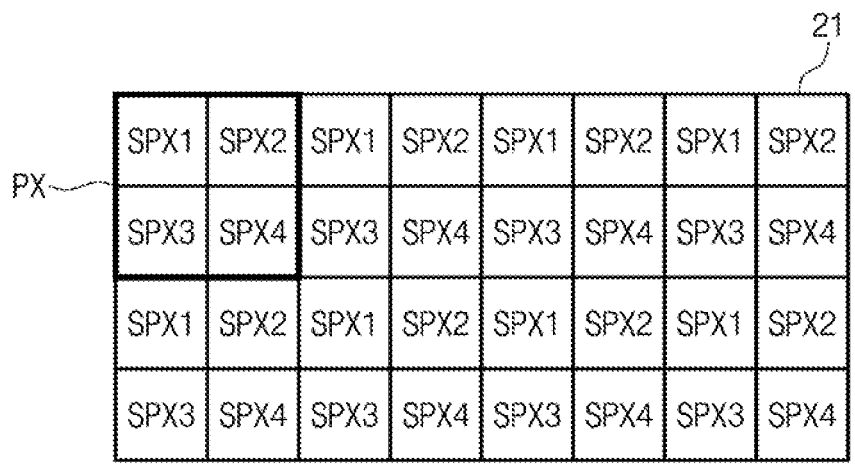
Figure 4:
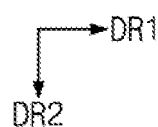
Figure 5:
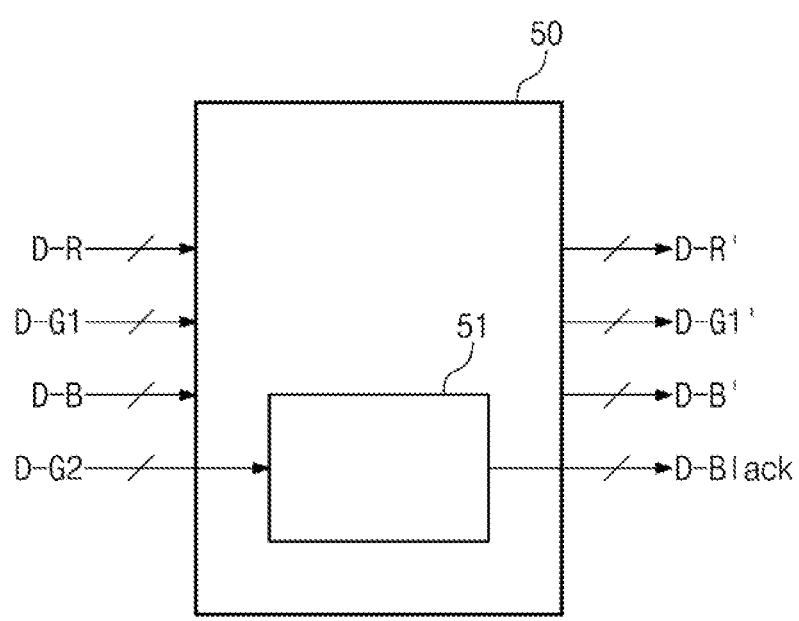
FIG. 5 is a block diagram of a controller according to an exemplary embodiment of the present disclosure.
Figure 6:
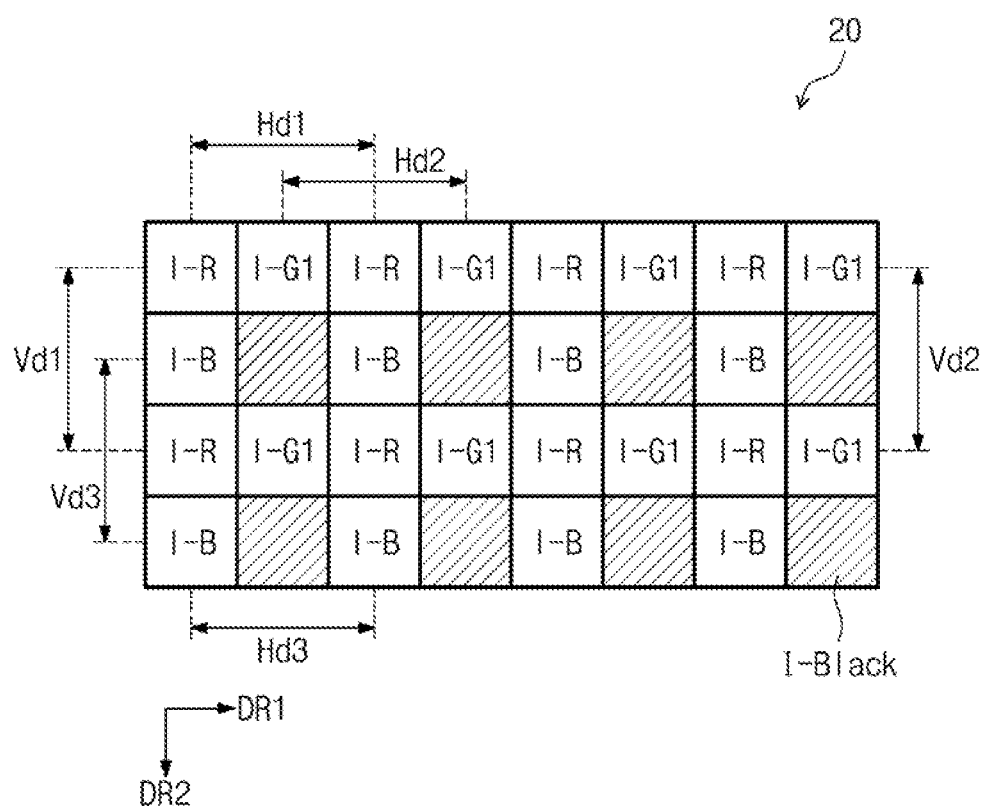
FIG. 6 illustrates a turned-on state of a spatial light modulation panel shown in FIG. 4.

FIG. 3 is a block diagram of a spatial light modulation panel 20 shown in FIG. 1, and FIG. 4 shows a configuration of the spatial light modulation panel 20 according to an exemplary embodiment of the present disclosure. FIG. 5 is a block diagram of a controller 50 according to an exemplary embodiment of the present disclosure, and FIG. 6 illustrates a turned-on state of the spatial light modulation panel 20 shown in FIG. 4.

Referring to FIG. 3, according to an embodiment, the hologram display device 100 further includes drivers 61 and 62 that drive the spatial light modulation panel 20 and the controller 50 that controls an operation of the drivers 61 and 62.

According to an embodiment, the spatial light modulation panel 20 further includes a plurality of pixels PX and a plurality of signal lines GL and DL connected to the pixels PX that are used for driving the pixels PX. The pixels PX are arranged along first and second directions DR1 and DR2 in a matrix form. The pixels PX are spaced apart from each other so that the pixels PX do not interfere with each other.

According to an embodiment, the pixels PX are independently driven by the signal lines GL and DL. The signal lines GL and DL include a plurality of gate lines GL and a plurality of data lines DL. The gate lines GL extend in a first direction DR1, and the data lines DL extend in a second direction DR2 perpendicular to the first direction DR1. Each pixel PX includes a transistor, two transparent electrodes, and a liquid crystal layer interposed between the two transparent electrodes. The transistor is connected to a corresponding gate line GL and a corresponding data line DL to control an ON/OFF state of each pixel PX. When each pixel PX is turned on, an electric field is formed between the two transparent electrodes, and a transmittance of the liquid crystal layer varies depending on an intensity of the electric field, thereby controlling a transmittance of the light received from the light source unit 10.

According to an embodiment, the drivers 61 and 62 include a gate driver 61 and a data driver 62. The gate driver 61 is connected to the gate lines GL to drive the gate lines GL, and the data driver 62 is connected to the data lines DL to drive the data lines DL.

According to an embodiment, the controller 50 controls the operation of the spatial light modulation panel 20 and the drivers 61 and 62.

Referring to FIG. 4, according to an embodiment, the spatial light modulation panel 20 includes a pixel array unit 21 and a color filter unit 22.

According to an embodiment, the pixel array unit 21 includes the pixels PX arranged in a matrix form. The pixels PX are arranged in the first and second directions DR1 and DR2. Each pixel PX includes a first, second, third, and fourth sub-pixels SPX1, SPX2, SPX3, and SPX4. The first, second, third, and fourth sub-pixels SPX1, SPX2, SPX3, and SPX4 are each smaller than the pixel PX. As the pixel PX is divided into four sub-pixels SPX1, SPX2, SPX3, and SPX4, a resolution of the spatial light modulation panel 20 is improved.

According to an embodiment, the second sub-pixel SPX2 is disposed adjacent to the first sub-pixel SPX1 in the first direction DR1, and the third sub-pixel SPX3 is disposed adjacent to the first sub-pixel SPX1 in the second direction DR2. The fourth sub-pixel SPX4 is disposed adjacent to the second sub-pixel SPX2 in the second direction DR2, and the fourth sub-pixel SPX4 is disposed adjacent to the third sub-pixel SPX3 in the first direction DR1.

According to an embodiment, the color filter unit 22 includes a plurality of first color filters R, a plurality of second color filters G1 and G2, and a plurality of third color filters B. In a present exemplary embodiment, the number of the second color filters G1 and G2 is greater than the number of each of the first and third color filters R and B. In an embodiment of the present disclosure, the first color filters R are red filters, the second color filters G1 and G2 are green filters, and the third color filters B are blue filters.

According to an embodiment, the first to fourth sub-pixels SPX1 to SPX4 correspond to one first color filter R, one third color filter B, and two second color filters G1 and G2. In detail, the first sub-pixel SPX1 corresponds to one first color filter R, the second sub-pixel SPX2 corresponds to one second color filter G1, the third sub-pixel SPX3 corresponds to one third color filter B, and the fourth sub-pixel SPX4 corresponds to the other second color filter G2.

Referring to FIGS. 4 and 5, the controller 50 receives data that corresponds to each pixel PX. In detail, the controller 50 receives first sub-pixel data D-R that corresponds to the first sub-pixel SPX1, second sub-pixel data D-G1 that corresponds to the second sub-pixel SPX2, third sub-pixel data D-B that corresponds to the third sub-pixel SPX3, and fourth sub-pixel data D-G2 that corresponds to the fourth sub-pixel SPX4. The controller 50 converts a data format of the first, second, and third sub-pixel data D-R, D-G1, and D-B and transmits the converted first, second, and third sub-pixel data D-R', D-G1', and D-B' to the data driver 62. That is, the controller 50 converts the data format of the first, second, and third sub-pixel data D-R, D-G1, and D-B and does not convert grayscale information of the first, second, and third sub-pixel data D-R, D-G1, and D-B. The converted first, second, and third sub-pixel data D-R', D-G1', and D-B' have substantially the same grayscale information as the first, second, and third sub-pixel data D-R, D-G1, and D-B.

For example, according to an embodiment, the controller 50 includes a black grayscale converter 51. The black grayscale converter 51 receives the fourth sub-pixel data D-G2, converts the fourth sub-pixel data D-G2 to black grayscale data D-Black, and outputs the black grayscale data D-Black. That is, the black grayscale converter 51 converts grayscale information of the fourth sub-pixel data D-G2 to black grayscale information to generate the black grayscale data D-Black.

FIG. 5 shows the embodiment in which the black grayscale converter 51 converts the fourth sub-pixel data D-G2 to the black grayscale data D-Black as a representative example, however, embodiments of the present disclosure are not limited thereto. That is, in other embodiments, the black grayscale converter 51 may convert sub-pixel data that corresponds to one of the second and fourth sub-pixel data D-G1 and D-G2 to the black grayscale data D-Black. For example, the black grayscale converter 51 converts the second sub-pixel data D-G1 to the black grayscale data D-Black. In this case, the controller 50 converts the data format of the fourth sub-pixel data D-G2 and outputs the fourth sub-pixel data for which grayscale information are not converted.

Referring to FIGS. 4 and 6, according to an embodiment, the first, second, and third sub-pixels SPX1, SPX2, and SPX3 display colored images that respectively correspond to the converted first, second, and third sub-pixel data D-R', D-G1', and D-B' in the turned-on state of the spatial light modulation panel 20. However, the fourth sub-pixel SPX4 displays a black grayscale that corresponds to the black grayscale data D-Black.

In an exemplary embodiment, the images displayed by the first, second, and third sub-pixels SPX1, SPX2, and SPX3 are referred to as a first color image I-R, a second color image I-G1, and a third color image I-B, respectively. In an embodiment of the present disclosure, the first color image I-R is a red image, the second color image I-G1 is a green image, and the third color image I-B is a blue image. In addition, the image displayed by the fourth sub-pixel SPX4 is referred to as a black grayscale image I-Black.

According to an embodiment, the first color images I-R are spaced apart from each other by a predetermined distance in the first and second directions DR1 and DR2. That is, the first color images I-R are spaced apart from each other in the first direction DR1 by a first horizontal distance Hd1 and are spaced apart from each other the second direction DR2 by a first vertical distance Vd1. The first horizontal distance Hd1 and the first vertical distance Vd1 may be equal to each other or may differ from each other.

According to an embodiment, the second color images I-G1 are spaced apart from each other by a predetermined distance in the first and second directions DR1 and DR2. That is, the second color images I-G1 are spaced apart from each other in the first direction DR1 by a second horizontal distance Hd2 and are spaced apart from each other in the second direction DR2 by a second vertical distance Vd2. The second horizontal distance Hd2 is substantially equal to the first horizontal distance Hd1, and the second vertical distance Vd2 is substantially equal to the first vertical distance Vd1.

According to an embodiment, the third color images I-B are spaced apart from each other by a predetermined distance in the first and second directions DR1 and DR2. That is, the third color images I-B are spaced apart from each other in the first direction DR1 by a third horizontal distance Hd3 and are spaced apart from each other in the second direction DR2 by a third vertical distance Vd3. The third horizontal distance Hd3 is substantially equal to the first and second horizontal distances Hd1 and Hd2, and the third vertical distance Vd3 is substantially equal to the first and second vertical distances Vd1 and Vd2.

As described above, according to an embodiment, since the horizontal distances Hd1, Hd2, and Hd3 of the first, second, and third color images I-R, I-G1, and I-B are equal to each other and the vertical distances Vd1, Vd2, and Vd3 of the first, second, and third color images I-R, I-G1, and I-B are equal to each other, chromatic aberration can be prevented from occurring between the first, second, and third color images I-R, I-G1, and I-B. Thus, distortion of the holographic image due to chromatic aberration can be decreased.

Figure 7:
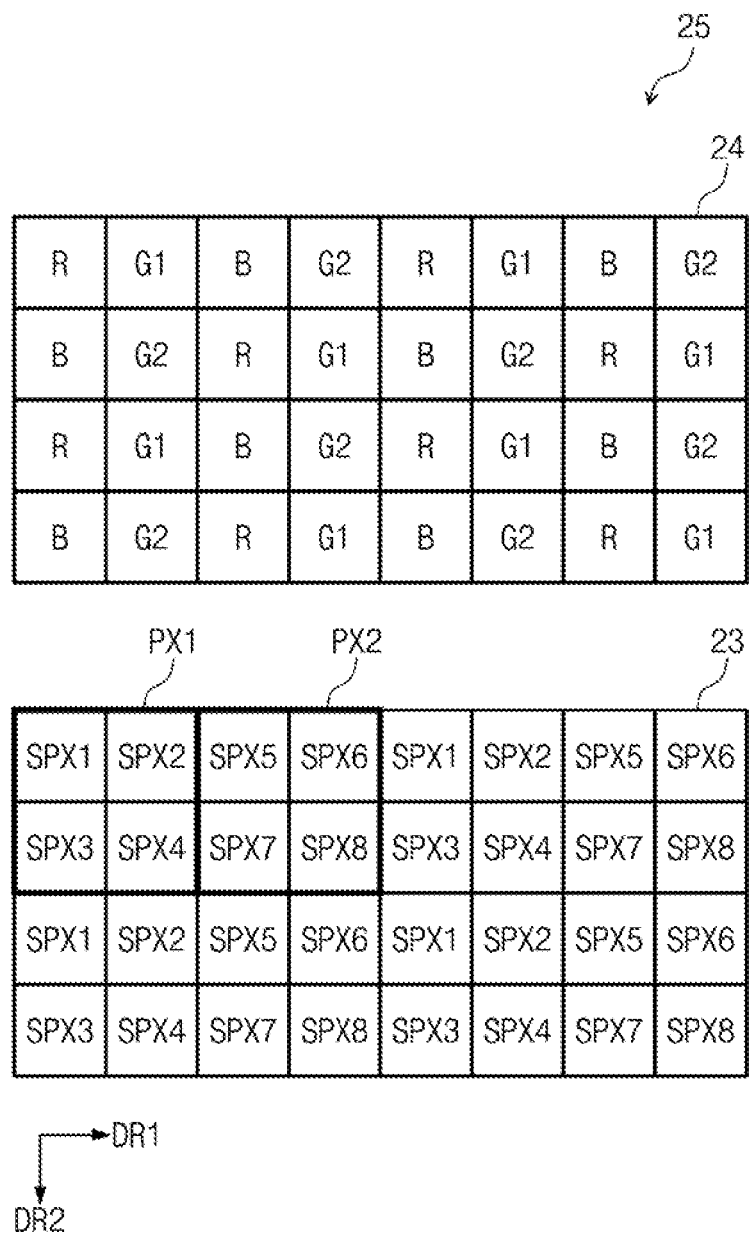
FIG. 7 shows a configuration of a spatial light modulation panel according to an exemplary embodiment of the present disclosure.
Figure 8A:
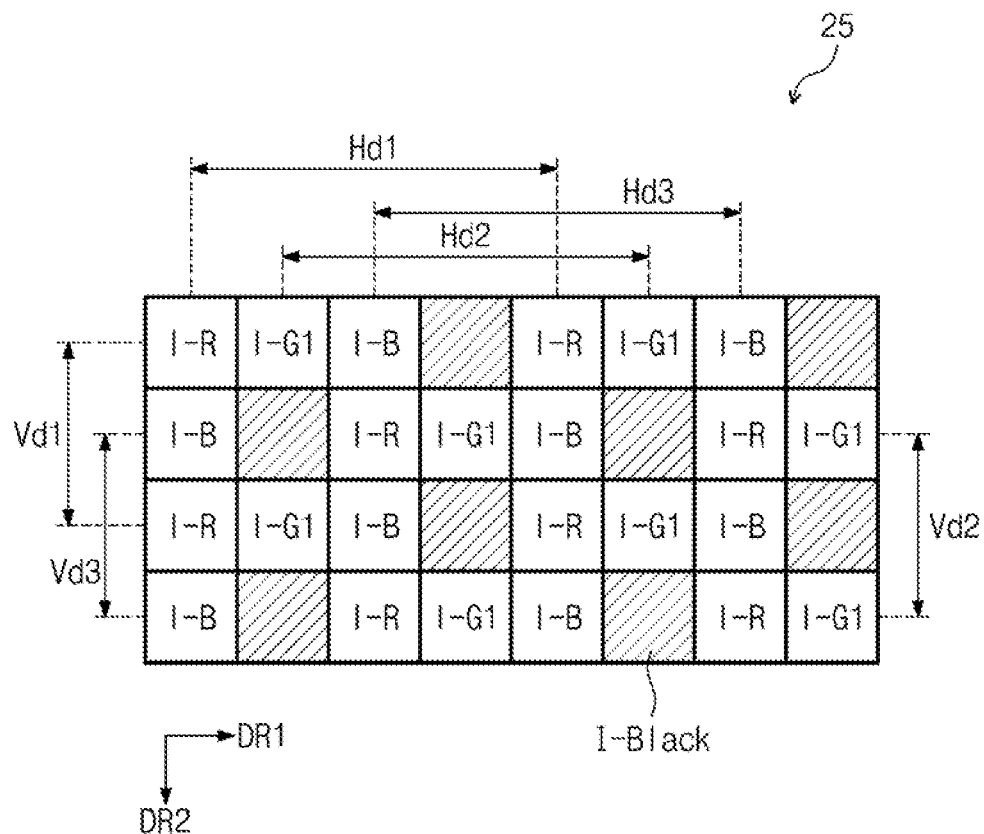
FIG. 8A illustrates a turned-on state of a spatial light modulation panel shown in FIG. 7.
Figure 8B:
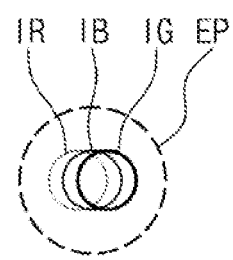
FIG. 8B illustrates first to third color holographic images in a pupil.

FIG. 7 shows a configuration of a spatial light modulation panel 25 according to an exemplary embodiment of the present disclosure, FIG. 8A illustrates a turned-on state of the spatial light modulation panel 25 shown in FIG. 7, and FIG. 8B illustrates first to third color holographic images IR to IB in a pupil EP.

Referring to FIG. 7, according to an embodiment, the spatial light modulation panel 25 includes a pixel array unit 23 and a color filter unit 24.

According to an embodiment, the pixel array unit 23 includes a plurality of first pixels PX1 arranged in odd-numbered columns and a plurality of second pixels PX2 arranged in even-numbered columns. The first pixels PX1 include first, second, third, and fourth sub-pixels SPX1, SPX2, SPX3, and SPX4, and the second pixels PX2 include fifth, sixth, seventh, and eighth sub-pixels SPX5, SPX6, SPX7, and SPX8. As the first pixel PX1 is divided into four sub-pixels SPX1, SPX2, SPX3, and SPX4, and the second pixel PX2 is divided into four sub-pixels SPX5, SPX6, SPX7, and SPX8, a resolution of the spatial light modulation panel 25 is improved.

According to an embodiment, the second sub-pixel SPX2 is disposed adjacent to the first sub-pixel SPX1 in the first direction DR1, and the third sub-pixel SPX3 is disposed adjacent to the first sub-pixel SPX1 in the second direction DR2. The fourth sub-pixel SPX4 is disposed adjacent to the second sub-pixel SPX2 in the second direction DR2 and disposed adjacent to the third sub-pixel SPX3 in the first direction DR1. The sixth sub-pixel SPX6 is disposed adjacent to the fifth sub-pixel SPX5 in the first direction DR1, and the seventh sub-pixel SPX7 is disposed adjacent to the fifth sub-pixel SPX5 in the second direction DR2. The eighth sub-pixel SPX8 is disposed adjacent to the sixth sub-pixel SPX6 in the second direction DR2 and disposed adjacent to the seventh sub-pixel SPX7 in the first direction DR1.

According to an embodiment, the color filter unit 24 includes a plurality of first color filters R, a plurality of second color filters G1 and G2, and a plurality of third color filters B. The number of the second color filters G1 and G2 is greater than the number of each of the first and third color filters R and B. As an example, the first color filters R are red filters, the second color filters G1 and G2 are green filters, and the third color filters B are blue filters.

According to an embodiment, the first to fourth sub-pixels SPX1 to SPX4 correspond to one first color filter R, one third color filter B, and two second color filters G1 and G2. In detail, the first sub-pixel SPX1 corresponds to one first color filter R, the second sub-pixel SPX2 corresponds to one second color filter G1, the third sub-pixel SPX3 corresponds to one third color filter B, and the fourth sub-pixel SPX4 corresponds to the other second color filter G2.

According to an embodiment, the fifth to eighth sub-pixels SPX5 to SPX8 correspond to one first color filter R, one third color filter B, and two second color filters G1 and G2. In detail, the fifth sub-pixel SPX5 corresponds to one third color filter B, the sixth sub-pixel SPX6 corresponds to one second color filter G2, the seventh sub-pixel SPX7 correspond to one first color filter R, and the eighth sub-pixel SPX8 corresponds to the other second color filter G1.

Referring to FIGS. 3, 5 and 7, according to an embodiment, the controller 50 receives data corresponding to each of the first and second pixels PX1 and PX2. In detail, the controller 50 receives first sub-pixel data D-R corresponding to the first and seventh sub-pixels SPX1 and SPX7, second sub-pixel data D-G1 corresponding to the second and eighth sub-pixels SPX2 and SPX8, third sub-pixel data D-B corresponding to the third and fifth sub-pixels SPX3 and SPX5, and fourth sub-pixel data D-G2 corresponding to the fourth and sixth sub-pixels SPX4 and SPX6. The controller 50 converts a data format of the first, second, and third sub-pixel data D-R, D-G1, and D-B and transmits the converted first, second, and third sub-pixel data D-R', D-G1', and D-B' to the data driver 62. That is, the controller 50 converts the data format of the first, second, and third sub-pixel data D-R, D-G1, and D-B and does not convert grayscale information of the first, second, and third sub-pixel data D-R, D-G1, and D-B. The converted first, second, and third sub-pixel data D-R', D-G1', and D-B' have substantially the same grayscale information as the first, second, and third sub-pixel data D-R, D-G1, and D-B.

According to an embodiment, the black grayscale converter 51 in the controller 50 receives the fourth sub-pixel data D-G2, converts the fourth sub-pixel data D-G2 to black grayscale data D-Black, and outputs the black grayscale data D-Black. That is, the black grayscale converter 51 converts grayscale information of the fourth sub-pixel data D-G2 to black grayscale information and generates the black grayscale data D-Black.

Referring to FIGS. 5, 7, and 8A, according to an embodiment, in the turned-on state of the spatial light modulation panel 25, the first, second, and third sub-pixels SPX1, SPX2, and SPX3 display colored images that respectively correspond to the converted first, second, and third sub-pixel data D-R', D-G1', and D-B', and the fifth, seventh, and eighth sub-pixels SPX5, SPX7, and SPX8 display colored images that respectively corresponding to the converted first, second, and third sub-pixel data D-R', D-G1', and D-B'. The fourth and sixth sub-pixels SPX4 and SPX6 display a black grayscale image I-Black that corresponds to the black grayscale data D-Black.

In an exemplary embodiment, the image displayed by the first and seventh sub-pixels SPX1 and SPX7 is referred to as a first color image I-R, the image displayed by the second and eighth sub-pixels SPX2 and SPX8 is referred to as a second color image I-G1, and the image displayed by the third and fifth sub-pixels SPX3 and SPX5 is referred to as a third color image I-B. In an embodiment of the present disclosure, the first color image I-R is a red image, the second color image I-G1 is a green image, and the third color image I-B is a blue image. In addition, the image displayed by the fourth and sixth sub-pixels SPX4 and SPX6 is referred to as a black grayscale image I-Black.

In an exemplary embodiment, the first color images I-R are spaced apart from each other by a predetermined distance in the first and second directions DR1 and DR2. That is, the first color images I-R are spaced apart from each other in the first direction DR1 by a first horizontal distance Hd1 and are spaced apart from each other in the second direction DR2 by a first vertical distance Vd1. The first horizontal distance Hd1 and the first vertical distance Vd1 may be equal to each other or may differ from each other.

In an exemplary embodiment, the second color images I-G1 are spaced apart from each other by a predetermined distance in the first and second directions DR1 and DR2. That is, the second color images I-G1 are spaced apart from each other in the first direction DR1 by a second horizontal distance Hd2 and are spaced apart from each other in the second direction DR2 by a second vertical distance Vd2. The second horizontal distance Hd2 is substantially equal to the first horizontal distance Hd1, and the second vertical distance Vd2 is substantially equal to the first vertical distance Vd1.

In an exemplary embodiment, the third color images I-B are spaced apart from each other by a predetermined distance in the first and second directions DR1 and DR2. That is, the third color images I-B may be spaced apart from each other in the first direction DR1 by a third horizontal distance Hd3 and are spaced apart from each other in the second direction DR2 by a third vertical distance Vd3. The third horizontal distance Hd3 is substantially equal to the first and second horizontal distances Hd1 and Hd2, and the third vertical distance Vd3 is substantially equal to the first and second vertical distances Vd1 and Vd2.

As described above, according to an embodiment, since the horizontal distances Hd1, Hd2, and Hd3 of the first, second, and third color images I-R, I-G1, and I-B are as all equal to each other and the vertical distances Vd1, Vd2, and Vd3 of the first, second, and third color images I-R, I-G1, and I-B are as all equal to each other, chromatic aberration is prevented from occurring between the first, second, and third color images I-R, I-G1, and I-B.

That is, as shown in FIGS. 8A and 8B, according to an embodiment, a first color holographic image IR that corresponds to the first color image I-R, a second color holographic image IG that corresponds to the second color image I-G1, and a third color holographic image IB that corresponds to the third color image I-B are located in a pupil EP of an observer. Thus, distortion of the holographic image due to chromatic aberration may be prevented or decreased.

Figure 9:
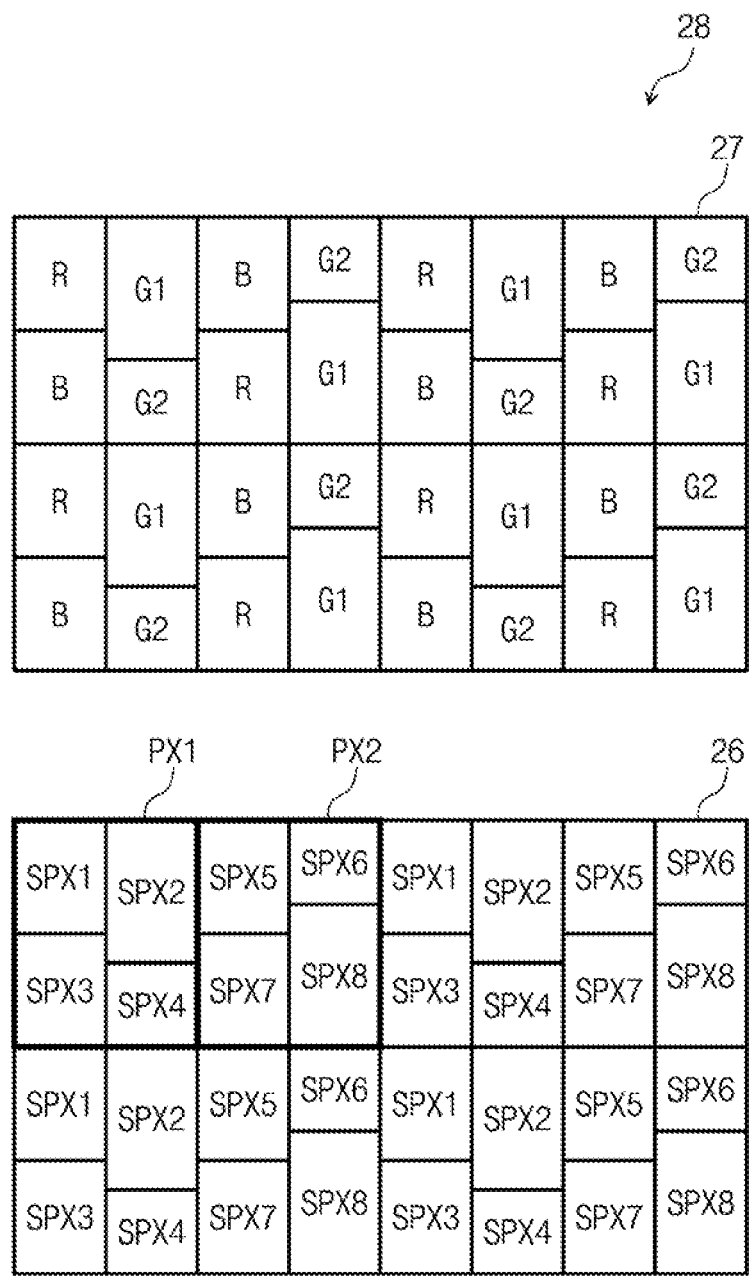
FIG. 9 illustrates a configuration of a spatial light modulation panel according to an exemplary embodiment of the present disclosure.
Figure 10:
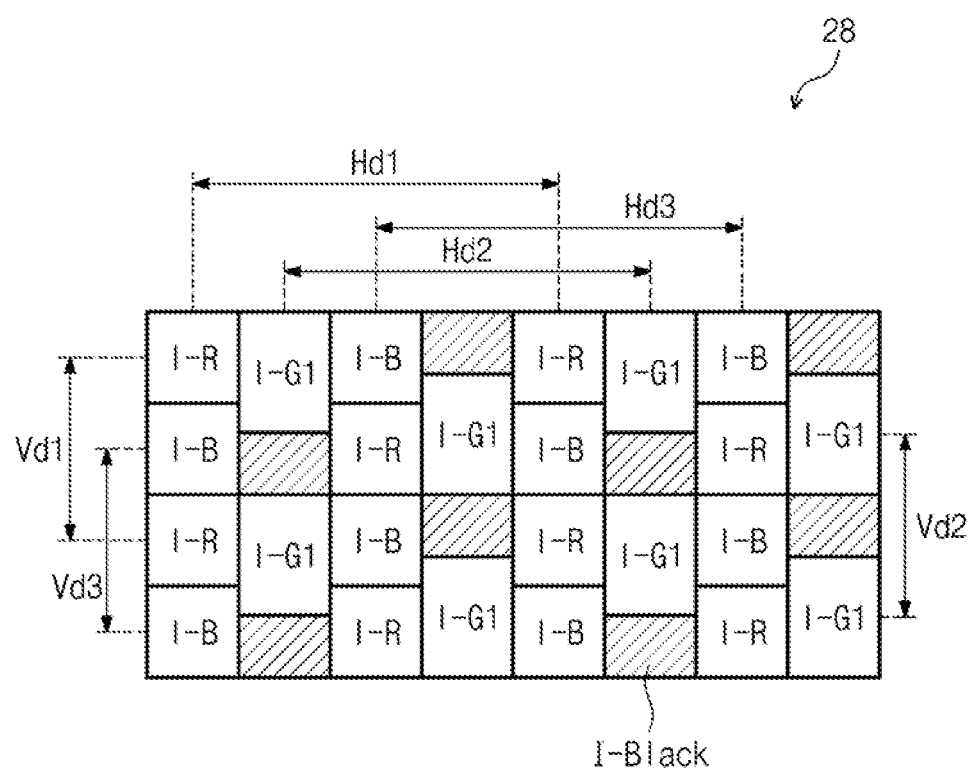
FIG. 10 illustrates a turned-on state of a spatial light modulation panel shown in FIG. 9.

FIG. 9 illustrates a configuration of a spatial light modulation panel 28 according to an exemplary embodiment of the present disclosure, and FIG. 10 illustrates a turned-on state of the spatial light modulation panel 28 shown in FIG. 9.

Referring to FIGS. 9 and 10, in a pixel array unit 26 of the spatial light modulation panel 28 according to an exemplary embodiment of the present disclosure, a second sub-pixel SPX2 is larger in size than the first and third sub-pixels SPX1 and SPX3, and a fourth sub-pixel SPX4 is smaller in size than the first and third sub-pixels SPX1 and SPX3. In addition, a sixth sub-pixel SPX6 is smaller in size than the fifth and seventh sub-pixels SPX5 and SPX7, and an eighth sub-pixel SPX8 is larger in size than the fifth and seventh sub-pixels SPX5 and SPX7.

According to an embodiment, a color filter unit 27 of the spatial light modulation panel 28 includes second color filters G1 that correspond to the size of the second and eighth sub-pixels SPX2 and SPX8. That is, an area of the second color filters G1 that correspond to the second and eighth sub-pixels SPX2 and SPX8 is greater than an area of the second color filters G2 that correspond to the fourth and sixth sub-pixels SPX4 and SPX6. In addition, an area of the second color filters G1 that correspond to the second and eighth sub-pixels SPX2 and SPX8 is greater than an area of the first color filter R that corresponds to the first and seventh sub-pixels SPX1 and SPX7 and an area of the third color filter B that corresponds to the third and fifth sub-pixels SPX3 and SPX5. Similarly, an area of the second color filters G2 that correspond to the fourth and sixth sub-pixels SPX4 and SPX6 is less than an area of the first color filter R that corresponds to the first and seventh sub-pixels SPX1 and SPX7 and an area of the third color filter B that corresponds to the third and fifth sub-pixels SPX3 and SPX5.

According to an embodiment, since an area of a second color image I-G1 displayed through the second and eighth sub-pixels SPX2 and SPX8 becomes larger than an area of the second color image I-G1 shown in FIG. 8, a transmittance of first and second pixels PX1 and PX2 increases.

However, as shown in FIG. 10, according to an embodiment, since horizontal distances Hd1, Hd2, and Hd3 of first, second, and third color images I-R, I-G1, and I-B are equal to each other and vertical distances Vd1, Vd2, and Vd3 of the first, second, and third color images I-R, I-G1, and I-B are equal to each other, chromatic aberration is prevented from occurring between the first, second, and third color images I-R, I-G1, and I-B. Thus, transmittance of the holographic image is improved, and distortion of the holographic image due to chromatic aberration is decreased.

Figure 11A:
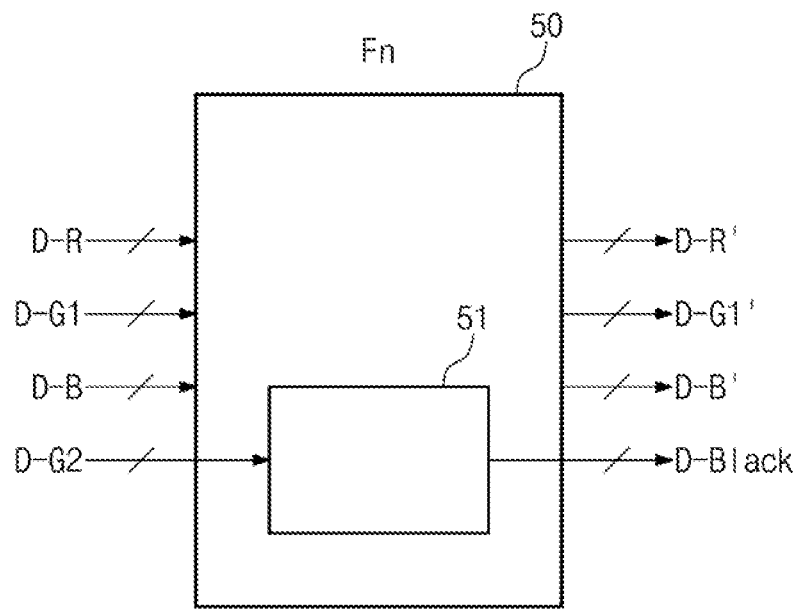
FIG. 11A shows an output of a controller in an n-th frame.
Figure 11B:
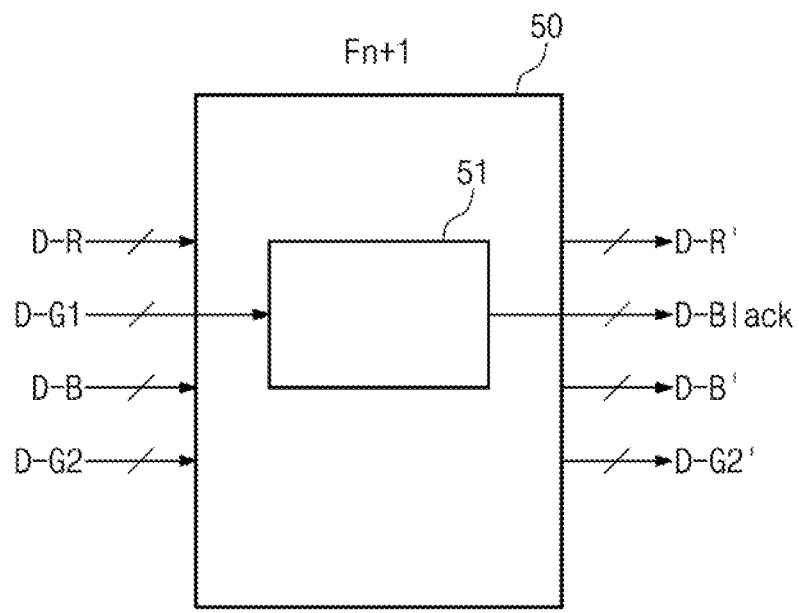
FIG. 11B shows an output of a controller in an (n+1)th frame.
Figure 12A:
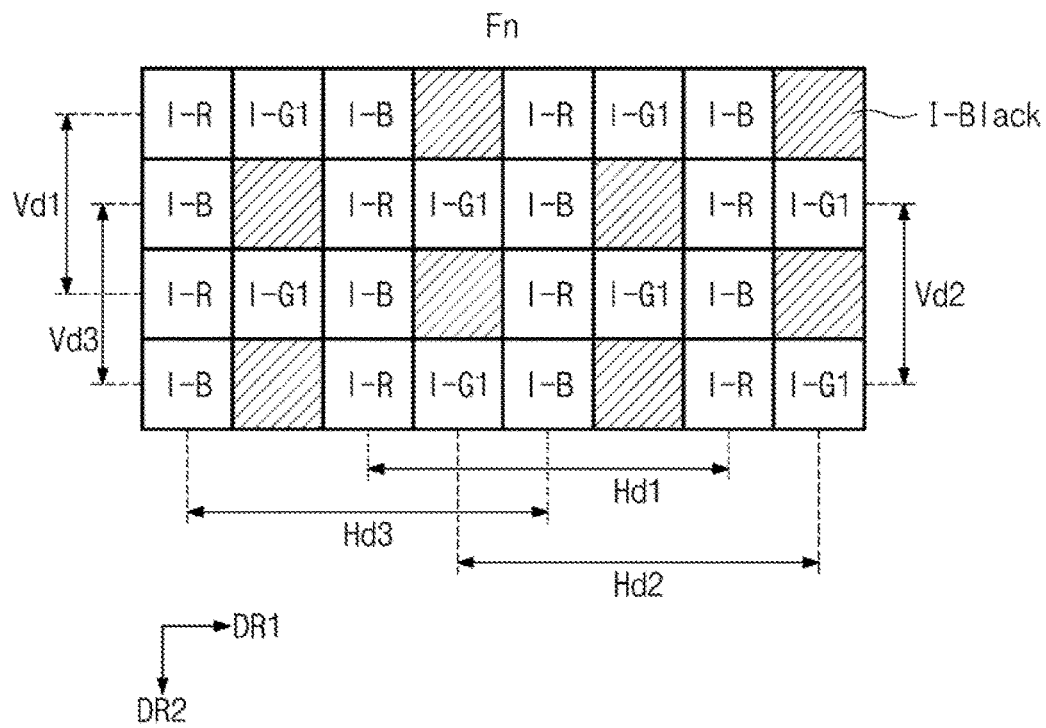
FIG. 12A illustrates a turned-on state of a spatial light modulation panel in the n-th frame.
Figure 12B:
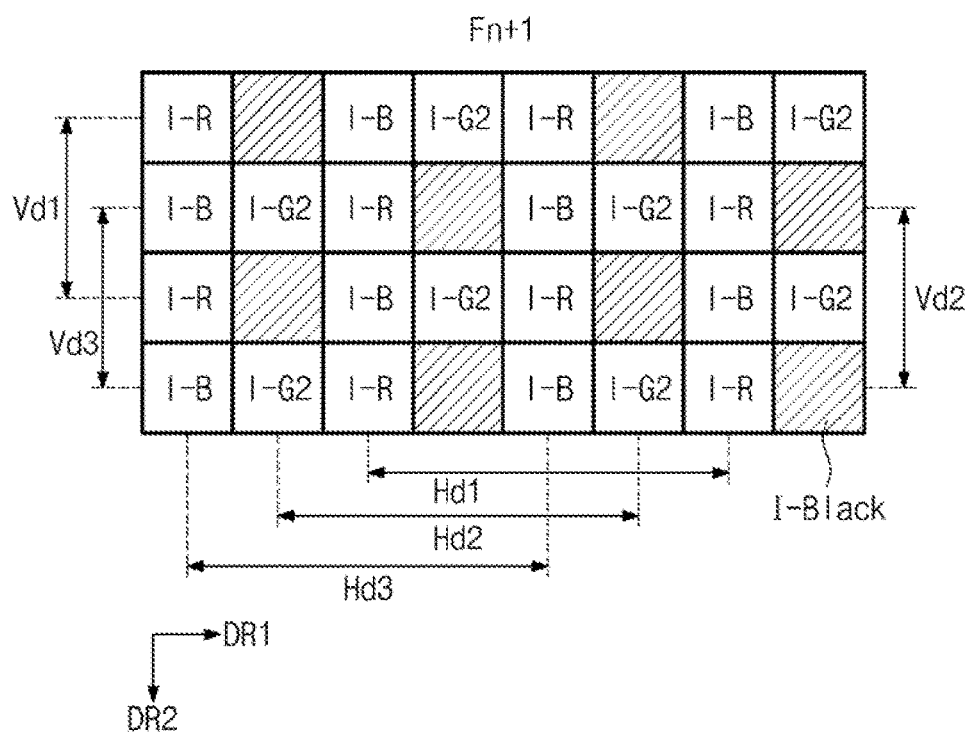
FIG. 12B illustrates a turned-on state of a spatial light modulation panel in the (n+1)th frame.

FIG. 11A shows an output of the controller 50 in an n-th frame Fn, and FIG. 11B shows an output of the controller 50 in an (n+1)th frame Fn+1. FIG. 12A illustrates a turned-on state of the spatial light modulation panel 25 shown in FIG. 7 in the n-th frame Fn, and FIG. 12B illustrates a turned-on state of the spatial light modulation panel 25 shown in FIG. 7 in the (n+1)th frame Fn+1.

Referring to FIGS. 7 and 11A, according to an embodiment, the controller 50 outputs data for each pixel PX in the unit of one frame. Accordingly, the spatial light modulation panel 25 displays a desired image in the unit of one frame.

According to an embodiment, the controller 50 receives the first sub-pixel data D-R that corresponds to the first and seventh sub-pixels SPX1 and SPX7, the second sub-pixel data D-G1 that corresponds to the second and eighth sub-pixels SPX2 and SPX8, the third sub-pixel data D-B that corresponds to the third and fifth sub-pixels SPX3 and SPX5, and the fourth sub-pixel data D-G2 that corresponds to the fourth and sixth sub-pixels SPX4 and SPX6.

According to an embodiment, in the n-th frame Fn, the controller 50 converts the data format of the first, second, and third sub-pixel data D-R, D-G1, and D-B and transmits the converted first, second, and third sub-pixel data D-R', D-G1', and D-B' to the data driver 62.

According to an embodiment, in the n—the frame Fn, the black grayscale converter 51 in the controller 50 converts the fourth sub-pixel data D-G2 to the black grayscale data D-Black and outputs the black grayscale data D-Black. That is, the black grayscale converter 51 converts the grayscale information of the fourth sub-pixel data D-G2 to the black grayscale information and generates the black grayscale data D-Black.

Referring to FIGS. 7 and 11B, according to an embodiment, in the (n+1)th frame Fn+1, the controller 50 converts the data format of the first, third, and fourth sub-pixel data D-R, D-B, and D-G2 and transmits the converted first, third, and fourth sub-pixel data D-R', D-B', and D-G2' to the data driver 62.

In the (n+1)th frame Fn+1, according to an embodiment, the black grayscale converter 51 converts the second sub-pixel data D-G1 to the black grayscale data D-Black and outputs the black grayscale data D-Black. That is, the black grayscale converter 51 converts the grayscale information of the second sub-pixel data D-G1 to the black grayscale information and generates the black grayscale data D-Black.

Referring to FIGS. 7, 11A, and 12A, according to an embodiment, in the n-th frame Fn, the first, second, and third sub-pixels SPX1, SPX2, and SPX3 of the spatial light modulation panel 25 display colored images that respectively correspond to the converted first, second, and third sub-pixel data D-R', D-G1', and D-B', and the fifth, seventh, and eighth sub-pixels SPX5, SPX7, and SPX8 display colored images that respectively correspond to the converted first, second, and third sub-pixel data D-R', D-G1', and D-B'. The fourth and sixth sub-pixels SPX4 and SPX6 display the black grayscale image I-Black that corresponds to the black grayscale data D-Black.

In a present exemplary embodiment, in the n-th frame Fn, the image displayed by the first and seventh sub-pixels SPX1 and SPX7 is referred to as the first color image I-R, the image displayed by the second and eighth sub-pixels SPX2 and SPX8 is referred to as the second color image I-G1, and the image displayed by the third and fifth sub-pixels SPX3 and SPX5 is referred to as the third color image I-B. In an embodiment of the present disclosure, the first color image I-R is a red image, the second color image I-G1 is a green image, and the third color image I-B is a blue image. In addition, the image displayed by the fourth and sixth sub-pixels SPX4 and SPX6 is referred to as the black grayscale image I-Black.

Referring to FIGS. 7, 11B, and 12B, according to an embodiment, in the (n+1)th frame Fn+1, the first, third, and fourth sub-pixels SPX1, SPX3, and SPX4 of the spatial light modulation panel 25 display colored images that respectively correspond to the converted first, third, and fourth sub-pixel data D-R', D-B', and D-G2', and the fifth, sixth, and seventh sub-pixels SPX5, SPX6, and SPX7 display colored images that respectively correspond to the converted first, third, and fourth sub-pixel data D-R', D-B', and D-G2'. The second and eighth sub-pixels SPX2 and SPX8 display the black grayscale image I-Black that corresponds to the black grayscale data D-Black.

In a present exemplary embodiment, in the (n+1)th frame Fn+1, the image displayed by the first and seventh sub-pixels SPX1 and SPX7 is referred to as the first color image I-R, the image displayed by the fourth and sixth sub-pixels SPX4 and SPX6 is referred to as the fourth color image I-G2, and the image displayed by the third and fifth sub-pixels SPX3 and SPX5 is referred to as the third color image I-B. In an embodiment of the present disclosure, the first color image I-R is a red image, the fourth color image I-G2 is a green image, and the third color image I-B is a blue image. In addition, the image displayed by the second and eighth sub-pixels SPX2 and SPX8 is referred to as the black grayscale image I-Black.

As shown in FIGS. 12A and 12B, according to an embodiment, the sub-pixels that display the black grayscale image I-Black change every frame. In a present exemplary embodiment, the sub-pixels that display the black grayscale image I-Black change in the unit of one frame, however, embodiments of the present disclosure are not be limited thereto. In another example of the present disclosure, the sub-pixels that display the black grayscale image I-Black change in the unit of two or more frames.

Referring to FIGS. 12A and 12B, according to an embodiment, the horizontal distances Hd1, Hd2, and Hd3 of the first, second, and third color images I-R, I-G1, and I-B are equal to each other in every frame, and the vertical distances Vd1, Vd2, and Vd3 of the first, second, and third color images I-R, I-G1, and I-B are equal to each other in every frame. Accordingly, chromatic aberration is prevented from occurring between the first, second, and third color images I-R, I-G1, and I-B every frame. Thus, distortion of a holographic image due to chromatic aberration is decreased.

Figure 13:
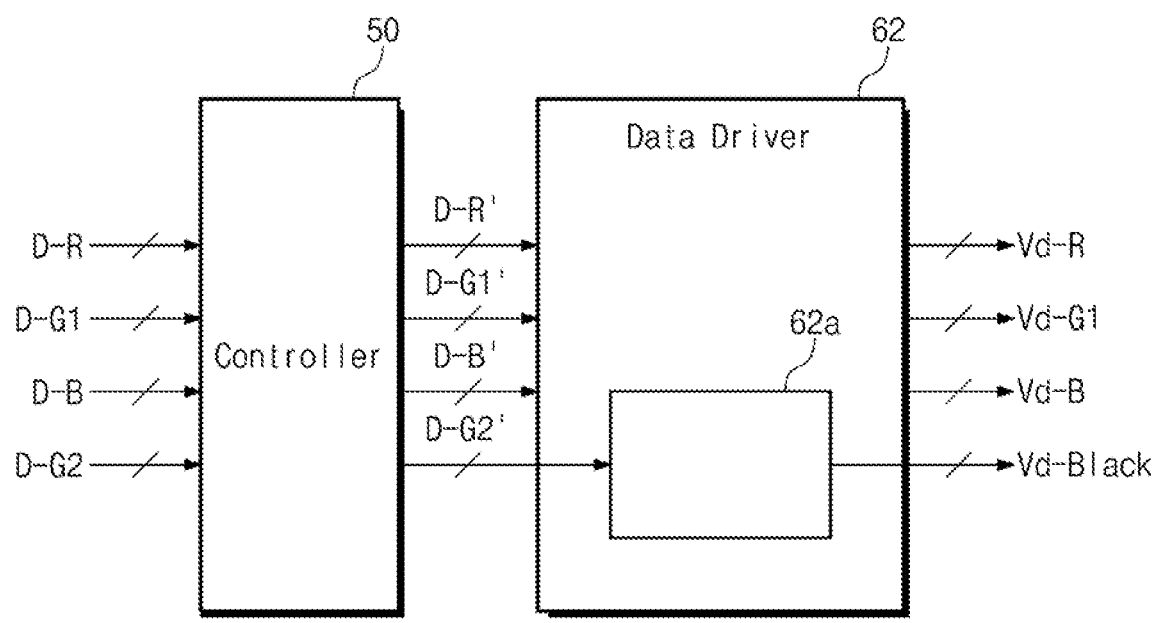
FIG. 13 is a block diagram of a controller and a data driver according to an exemplary embodiment of the present disclosure.

FIG. 13 is a block diagram of a controller 50 and a data driver 62 according to an exemplary embodiment of the present disclosure.

Referring to FIGS. 7 and 13, according to an embodiment, the controller 50 receives data that corresponds to each of the first and second pixels PX1 and PX2. In detail, the controller 50 receives first sub-pixel data D-R that corresponds to the first and seventh sub-pixels SPX1 and SPX7, second sub-pixel data D-G1 that corresponds to the second and eighth sub-pixels SPX2 and SPX8, third sub-pixel data D-B that corresponds to the third and fifth sub-pixels SPX3 and SPX5, and fourth sub-pixel data D-G2 that corresponds to the fourth and sixth sub-pixels SPX4 and SPX6.

According to an embodiment, the controller 50 converts a data format of the first, second, third, and fourth sub-pixel data D-R, D-G1, D-B, and D-G2 and transmits the converted first, second, third, and fourth sub-pixel data D-R', D-G1', D-B', and D-G2' to the data driver 62. That is, the controller 50 converts the data format of the first, second, third, and fourth sub-pixel data D-R, D-G1, D-B, and D-G2 and does not convert grayscale information of the first, second, third, and fourth sub-pixel data D-R, D-G1, D-B, and D-G2. The converted first, second, third, and fourth sub-pixel data D-R', D-G1', D-B', and D-G2' have substantially the same grayscale information as the first, second, third, and fourth sub-pixel data D-R, D-G1, D-B, and D-G2. According to an embodiment, the data driver 62 receives the converted first, second, third, and fourth sub-pixel data D-R', D-G1', D-B', and D-G2' from the controller 50. The data driver 62 converts the converted first, second, and third sub-pixel data D-R', D-G1', and D-B' to first, second, and third data voltages Vd-R, Vd-G1, and Vd-B, respectively. The first, second, and third data voltages Vd-R, Vd-G1, and Vd-B have voltage levels that respectively correspond to grayscale information of the converted first, second, and third sub-pixel data D-R', D-G1', and D-B'.

In an embodiment of the present disclosure, the data driver 62 includes a black voltage converter 62a. The black voltage converter 62a receives the converted fourth sub-pixel data D-G2', converts the converted fourth sub-pixel data D-G2' to a black data voltage Vd-Black, and outputs the black data voltage Vd-Black. The black data voltage Vd-Black has a voltage level that corresponds to a black grayscale.

FIG. 13 shows an embodiment in which the black voltage converter 62a converts the converted fourth sub-pixel data D-G2' to the black data voltage Vd-Black as a representative example, however, embodiments of the present disclosure are not limited thereto. That is, in other embodiments, the black voltage converter 62a converts the sub-pixel data that corresponds to one of the converted second and fourth sub-pixel data D-G1' and D-G2' to the black data voltage Vd-Black. For example, in another embodiment, the black voltage converter 62a converts the converted second sub-pixel data D-G1' to the black data voltage Vd-Black. In this case, the data driver 62 converts the converted fourth sub-pixel data D-G2' to a fourth data voltage and outputs the fourth data voltage. The fourth data voltage has a voltage level that corresponds to grayscale information of the converted fourth sub-pixel data D-G2'.

Figure 14:
FIG. 14 illustrates a configuration of a spatial light modulation panel according to an exemplary embodiment of the present disclosure.
Figure 14:
Figure 15:
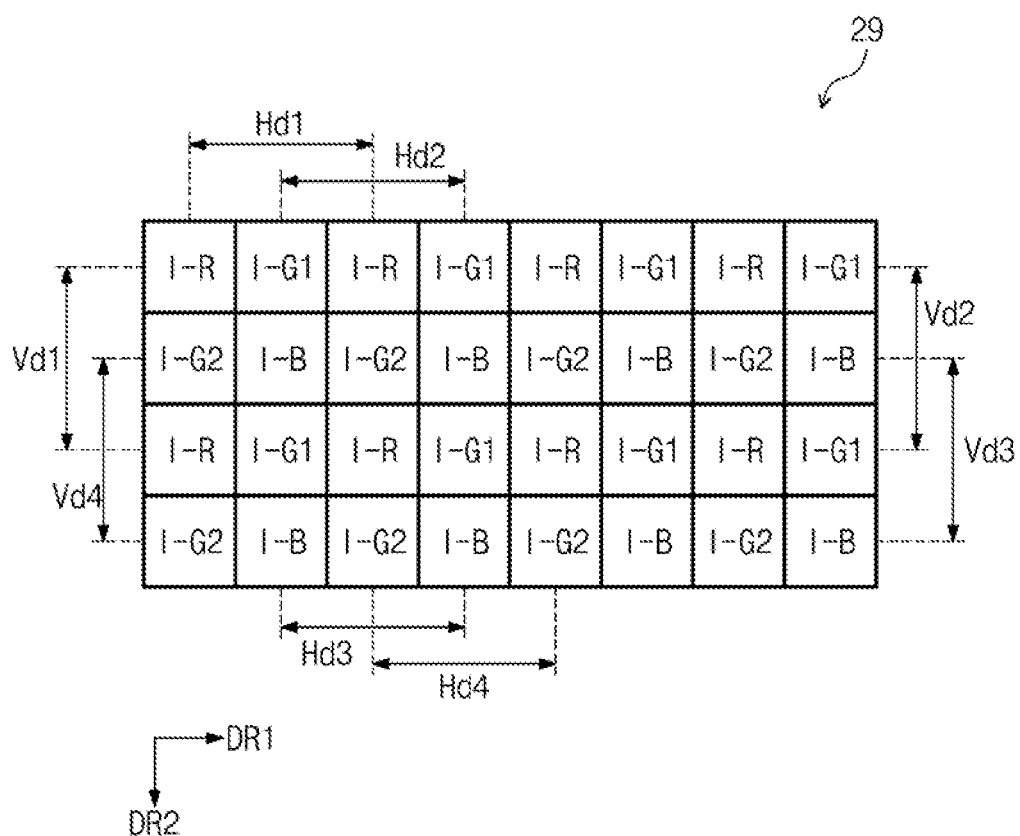
FIG. 15 illustrates a turned-on state of a spatial light modulation panel shown in FIG. 14.

FIG. 14 illustrates a configuration of a spatial light modulation panel 29 according to an exemplary embodiment of the present disclosure, and FIG. 15 illustrates a turned-on state of the spatial light modulation panel 29 shown in FIG. 14.

Referring to FIGS. 14 and 15, the spatial light modulation panel 29 according to a present exemplary embodiment includes a pixel array unit 21' and a color filter unit 22'.

According to an embodiment, the pixel array unit 21' includes pixels PX arranged in a matrix form. The pixels PX are arranged in the first and second directions DR1 and DR2. Each pixel PX includes first, second, third, and fourth sub-pixels SPX1, SPX2, SPX3, and SPX4.

According to an embodiment, the second sub-pixel SPX2 is disposed adjacent to the first sub-pixel SPX1 in the first direction DR1, and the third sub-pixel SPX3 is disposed adjacent to the second sub-pixel SPX2 in the second direction DR2. The fourth sub-pixel SPX4 is disposed adjacent to the first sub-pixel SPX1 in the second direction DR2, and the fourth sub-pixel SPX4 is disposed adjacent to the third sub-pixel SPX3 in the first direction DR1.

According to an embodiment, the color filter unit 22' includes a plurality of first color filters R, a plurality of second color filters G1 and G2, and a plurality of third color filters B. In a present exemplary embodiment, the number of the second color filters G1 and G2 is greater than the number of each of the first and third color filters R and B. In an embodiment of the present disclosure, the first color filters R are red filters, the second color filters G1 and G2 are green filters, and the third color filters B are blue filters.

According to an embodiment, the first to fourth sub-pixels SPX1 to SPX4 correspond to one first color filter R, one third color filter B, and two second color filters G1 and G2. In detail, the first sub-pixel SPX1 corresponds to one first color filter R, the second sub-pixel SPX2 corresponds to one second color filter G1, the third sub-pixel SPX3 corresponds to one third color filter B, and the fourth sub-pixel SPX4 corresponds to the other second color filter G2. Referring to FIGS. 14 and 15, according to an embodiment, the first, second, third, and fourth sub-pixels SPX1, SPX2, SPX3, and SPX4 display the first, second, third, and fourth color images I-R, I-G1, I-B, and I-G2, respectively, in the turned-on state of the spatial light modulation panel 29. In an embodiment of the present disclosure, the first color images I-R is a red image, the second and fourth color images I-G1 and I-G2 are green images, and the third color images I-B is a blue image.

According to an embodiment, the first color images I-R are spaced apart from each other in the first and second directions DR1 and DR2 by a predetermined distance. That is, the first color images I-R are spaced apart from each other in the first direction DR1 by a first horizontal distance Hd1 and are spaced apart from each other in the second direction DR2 by a first vertical distance Vd1. The first horizontal distance Hd1 and the first vertical distance Vd1 may be equal to each other or may differ from each other.

According to an embodiment, the second color images I-G1 are spaced apart from each other in the first and second directions DR1 and DR2 by a predetermined distance. That is, the second color images I-G1 are spaced apart from each other in the first direction DR1 by a second horizontal distance Hd2 and are spaced apart from each other in the second direction DR2 by a second vertical distance Vd2. The second horizontal distance Hd2 is substantially equal to the first horizontal distance Hd1, and the second vertical distance Vd2 is substantially equal to the first vertical distance Vd1.

According to an embodiment, the third color images I-B are spaced apart from each other in the first and second directions DR1 and DR2 by a predetermined distance. That is, the third color images I-B are spaced apart from each other in the first direction DR1 by a third horizontal distance Hd3 and are spaced apart from each other in the second direction DR2 by a third vertical distance Vd3. The third horizontal distance Hd3 is substantially equal to the first and second horizontal distances Hd1 and Hd2, and the third vertical distance Vd3 is substantially equal to the first and second vertical distances Vd1 and Vd2.

According to an embodiment, the fourth color images I-G2 are spaced apart from each other in the first and second directions DR1 and DR2 by a predetermined distance. That is, the fourth color images I-G2 are spaced apart from each other in the first direction DR1 by a fourth horizontal distance Hd4 and are spaced apart from each other in the second direction DR2 by a fourth vertical distance Vd4. The fourth horizontal distance Hd4 is substantially equal to the first, second, and third horizontal distances Hd1, Hd2, and Hd3, and the fourth vertical distance Vd4 is substantially equal to the first, second, and third vertical distances Vd1, Vd2, and Vd3. As described above, since the horizontal distances Hd1, Hd2, Hd3, and Hd4 of the first, second, third, and fourth color images I-R, I-G1, I-B, and I-G2 are equal to each other and the vertical distances Vd1, Vd2, Vd3, and Vd4 of the first, second, third, and fourth color images I-R, I-G1, I-B, and I-G2 are equal to each other, chromatic aberration can be prevented from occurring between the first, second, third, and fourth color images I-R, I-G1, I-B, and I-G2. Thus, distortion of the holographic image due to chromatic aberration is decreased.

Although exemplary embodiments of the present disclosure have been described, it is understood that embodiments of the present disclosure should not be limited to exemplary embodiments but various changes and modifications can be made by one of ordinary skill in the art within the spirit and scope of embodiments of the present disclosure as hereinafter claimed. Therefore, the disclosed subject matter should not be limited to any single embodiment described herein, and the scope of embodiments of the present inventive concept shall be determined according to the attached claims.

What is claimed is:

1. A hologram display device, comprising:
a light source unit that generates light;
a spatial light modulation panel that spatially modulates the light received from the light source unit and generates diffracted light; and
an optical unit that generates a holographic image using the diffracted light,
wherein the spatial light modulation panel comprises:
a plurality of first color filters;
a plurality of second color filters; and
a plurality of third color filters, wherein
a number of the second color filters is greater than a number of each of the first and third color filters, and
during a turned-on state of the spatial light modulation panel,
a distance in a plan view between second color images displayed through a first group of the second color filters is substantially equal to a distance in a plan view between first color images displayed through the first color filters and a distance in a plan view between third color images displayed through the third color filters, and
wherein black gray scale images are displayed through a second group of the second color filters during a turned-on state of the spatial light modulation panel.

2. The hologram display device of claim 1, wherein
the spatial light modulation panel comprises a plurality of pixels, and
each of the pixels comprises first, second, third, and fourth sub-pixels, and wherein
the first, second, third, and fourth sub-pixels correspond to one first color filter, one third color filter, and two second color filters.

3. The hologram display device of claim 2, wherein,
during the turned-on state of the spatial light modulation panel,
one sub-pixel of two sub-pixels that correspond to the two second color filters displays the second color images and
another sub-pixel of the two sub-pixels that correspond to the two second color filters displays the black grayscale images.

4. The hologram display device of claim 3, further comprising
a controller that controls the spatial light modulation panel,
wherein the controller receives first, second, third, and fourth sub-pixel data that respectively correspond to the first, second, third, and fourth sub-pixels and
comprises a black grayscale convener that converts sub-pixel data that corresponds to one of two sub-pixels of the first, second, third, and fourth sub-pixels to black grayscale data.

5. The hologram display device of claim 2, wherein,
the first sub-pixel corresponds to the one first color filter,
the second sub-pixel is adjacent to the first sub-pixel in a first direction and corresponds to one second color filter of the two second color filters,
the third sub-pixel is adjacent to the first sub-pixel in a second direction and corresponds to the one third color filter, and
the fourth sub-pixel is adjacent to the second sub-pixel in the second direction and is adjacent to the third sub-pixel in the first direction and corresponds to another second color filter of the two second color filters.

6. The hologram display device of claim 5, wherein during the turned-on state of the spatial light modulation panel,
one sub-pixel of the second and fourth sub-pixels displays the second color images and
another sub-pixel of the second and fourth sub-pixels displays the black grayscale images.

7. The hologram display device of claim 6, wherein the second sub-pixel has a different area from the fourth sub-pixel.

8. The hologram display device of claim 7, wherein
an area of the second sub-pixel is greater than an area of the fourth sub-pixel, and
during the turned-on state of the spatial light modulation panel,
the second sub-pixel displays the second color images and the fourth sub-pixel displays the black grayscale images.

9. The hologram display device of claim 5, wherein during the turned-on state of the spatial light modulation panel,
the second and fourth sub-pixels alternately display the black grayscale image at least every one frame.

10. The hologram display device of claim 2, wherein,
among the first, second, third, and fourth sub-pixels,
the first sub-pixel corresponds to the one first color filter,
the second sub-pixel adjacent to the first sub-pixel in a first direction corresponds to one second color filter of the two second color filters,
the third sub-pixel adjacent to the second sub-pixel in a second direction corresponds to the one third color filter, and
the fourth sub-pixel adjacent to the first sub-pixel in the second direction and adjacent to the third sub-pixel in the first direction corresponds to the other second color filter of the two second color filters.

11. The hologram display device of claim 10, wherein the second and fourth sub-pixels display the second color images during the turned-on state of the spatial light modulation panel.

12. The hologram display device of claim 1, wherein
the spatial light modulation panel comprises a plurality of pixels,
a first pixel of the plurality of pixels comprises first, second, third, and fourth sub-pixels, and
a second pixel of the plurality of pixels, which is adjacent to the first pixel in a first direction, comprises fifth, sixth, seventh, and eighth sub-pixels.

13. The hologram display device of claim 12, wherein
the first, second, third, and fourth sub-pixels correspond to one first color filter, one third color filter, and two second color filters, and
the fifth, sixth, seventh, and eighth sub-pixels correspond to one first color filter, one third color filter, and two second color filters.

14. The hologram display device of claim 13, wherein,
the first sub-pixel corresponds to the one first color filter,
the second sub-pixel is adjacent to the first sub-pixel in a first direction and corresponds to one second color filter of the two second color filters,
the third sub-pixel is adjacent to the first sub-pixel in a second direction and corresponds to the one third color filter,
the fourth sub-pixel is adjacent to the second sub-pixel in the second direction and adjacent to the third sub-pixel in the first direction and corresponds to another second color filter of the two second color filters,
the fifth sub-pixel corresponds to the one third color filter,
the sixth sub-pixel is adjacent to the fifth sub-pixel in the first direction and corresponds to one second color filter of the two second color filters,
the seventh sub-pixel is adjacent to the fifth sub-pixel in the second direction and corresponds to the one first color filter, and
the eighth sub-pixel is adjacent to the sixth sub-pixel in the second direction and adjacent to the seventh sub-pixel in the first direction and corresponds to another second color filter of the two second color filters.

15. The hologram display device of claim 14, wherein,
during the turned-on state of the spatial light modulation panel,
when the second and eighth sub-pixels display the second color images,
the fourth and sixth sub-pixels display the black grayscale images, or
when the second and eighth sub-pixels display the black grayscale images,
the fourth and sixth sub-pixels display the second color images.

16. The hologram display device of claim 14, wherein,
during the turned-on state of the spatial light modulation panel,
the second and eighth sub-pixels alternately display the black grayscale images with the fourth and sixth sub-pixels at least every one frame.

17. The hologram display device of claim 1, wherein,
during the turned-on state of the spatial light modulation panel,
a distance in a first direction between the second color images is substantially equal to a distance in the first direction between the first color images and a distance in the first direction between the third color images, and
a distance in a second direction between the second color images is substantially equal to a distance in the second direction between the first color images and a distance in the second direction between the third color images.

18. The hologram display device of claim 1, wherein
the first color filters are red filters,
the second color filters are green filters, and
the third color filters are blue filters.

19. The hologram display device of claim 1, wherein the spatial light modulation panel is a liquid crystal display panel.

20. A hologram display device, comprising:
a light source unit that generates light;
a spatial light modulation panel that spatially modulates the light received from the light source unit and generates diffracted light; and
an optical unit that generates a holographic image using the diffracted light, wherein the optical unit includes at least one lens,
wherein the spatial light modulation panel comprises:
a plurality of pixels, and each of the pixels comprises first, second, third, and
fourth sub-pixels;
a plurality of first color filters;
a plurality of second color filters; and
a plurality of third color filters, wherein
a number of the second color filters is greater than a number of each of the first and third color filters, and
during a turned-on state of the spatial light modulation panel,
a distance in a plan view between second color images displayed through a first group of the second color filters is substantially equal to a distance in a plan view between first color images displayed through the first color filters and a distance in a plan view between third color images displayed through the third color filters, and wherein the first, second, third, and fourth sub-pixels correspond to one first color filter, one third color filter, and two second color filters.

* * * * *